United States Patent Office 3,478,067
Patented Nov. 11, 1969

3,478,067
PROCESS FOR THE PREPARATION OF UNSATURATED 19-NOR STEROIDS
Daniel Bertin, Montrouge, and Andre Pierdet, Noisy-le-Sec, France, assignors to Roussel UCLAF, Paris, France, a corporation of France
No Drawing. Filed Mar. 10, 1967, Ser. No. 622,105
Claims priority, application France, Mar. 15, 1966, 53,487
The portion of the term of the patent subsequent to Nov. 1, 1983, has been disclaimed
Int. Cl. C07c 167/14, 169/10
U.S. Cl. 260—397.3
9 Claims

ABSTRACT OF THE DISCLOSURE

This invention relates to a process for the production of $\Delta^{4,9,11}$-gonatriene-3-ones of the formula

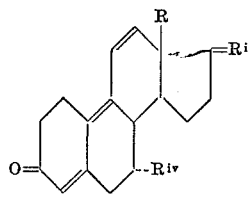

wherein R is lower alkyl; $R^i$ is selected from the group consisting of oxygen and $R^{ii}$ is selected from the group consisting of hydrogen and an acyl radical of an organic carboxylic acid having from 1 to 18 carbon atoms; $R^{iii}$ is selected from the group consisting of hydrogen, lower alkyl, lower alkenyl, lower alkynyl, substituted lower alkyl, substituted lower alkenyl and substituted lower alkynyl; and $R^{iv}$ is selected from the group consisting of hydrogen and methyl; which comprises subjecting the corresponding $\Delta^{4,9}$-gonadiene-11$\beta$-ol-3-one to the action of a strong acid in the presence of a nucleophilic agent selected from the group consisting of alkali metal cyanides, lower aliphatic carboxylic acid nitriles and trihaloacetamides and in the presence of an aprotic solvent and recovering said $\Delta^{4,9,11}$-gonatriene-3-ones.

THE PRIOR ART

The present invention relates to a novel process for the preparation of $\Delta^{4,9,11}$-gonatriene-3-ones of the general Formula I

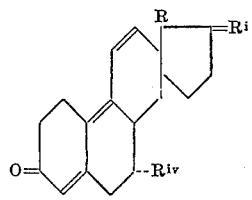

I

wherein R is a lower alkyl, $R^i$ is selected from the group consisting of oxygen and $R^{ii}$ is selected from the group consisting of hydrogen and the acyl radical of a lower organic carboxylic acid, $R^{iii}$ is selected from the group consisting of hydrogen and a lower aliphatic hydrocarbon radical, substituted or unsubstituted, saturated or unsaturated, and $R^{iv}$ is selected from the group consisting of hydrogen and methyl.

It is well known that these compounds exhibit interesting physiological properties [see, for example, Feyel-Cabanes, Annales d'Endocrinologie, Paris, vol. 26, pp. 95–101 (1965) and Nomine et al., C. R. Acad. Sci., vol. 260, pp. 4545–4548 (1965) and Anner et al., Second International Congress on Hormonal Steroids, Milan, Italy (1966)].

To arrive at these trienic compounds starting with the corresponding 11$\beta$-hydroxy - $\Delta^{4,9}$ - gonadienic derivatives, until now, concentrated sulfuric acid was acted upon the 11$\beta$-hydroxy-$\Delta^{4,9}$-gonadienic derivatives (according to the process described in the copending, commonly-assigned U.S. patent application Ser. No. 458,416, filed May 24, 1965, now Pat. No. 3,424,745).

However, when the starting steroid comprises particularly in the 17-position, a group sensitive to the action of strong, concentrated acids such as an $\alpha$-methyl, an $\alpha$-ethynyl, and $\alpha$-propynyl, an $\alpha$-chloroethynyl and others, this method can lead to a significant alteration and degradation of the molecule, and, moreover, it is apt to decrease the yields.

On the other hand, it is known that the action of certain nucleophilic agents, such as alcohols, alkylmercaptans or alkali metal azides, on a 3-oxo-$\Delta^{4,9}$-gonadiene, possessing a secondary alcohol function in the 11 position when the reaction is conducted in an acid medium and in an aprotic solvent, will lead chiefly to the formation of the corresponding ether-oxide-, thio-ether- or azido groups in the 11 position (see the copending, commonly-assigned U.S. patent application, Ser. No. 587,001, filed Oct. 17, 1966).

OBJECTS OF THE INVENTION

An object of the present invention is the development of a process for the production of $\Delta^{4,9,11}$-gonatriene-3-ones of the formula

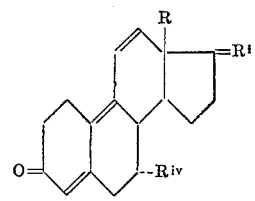

wherein R is lower alkyl; $R^i$ is selected from the group consisting of oxygen and $R^{ii}$ is selected from the group consisting of hydrogen and an acyl radical of an organic carboxylic acid having from 1 to 18 carbon atoms; $R^{iii}$ is selected from the group consisting of hydrogen, lower alkyl, lower alkenyl, lower alkynyl, substituted lower alkyl, substituted lower alkenyl and substituted lower alkynyl; and $R^{iv}$ is selected from the group consisting of hydrogen and methyl; which comprises subjecting the corresponding $\Delta^{4,9}$-gonadiene-11$\beta$-ol-3-one of the formula

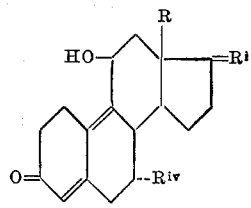

wherein R, $R^i$ and $R^{iv}$ have the above-assigned values, to the action of a strong acid in the presence of a nucleophilic agent selected from the group consisting of alkali metal cyanides, lower aliphatic carboxylic acid nitriles and trihaloacetamides and in the presence of an aprotic solvent and recovering said $\Delta^{4,9,11}$-gonatriene-3-ones.

These and other objects of the invention will become more apparent as the description thereof proceeds.

DESCRIPTION OF THE INVENTION

It has now been discovered that, in a startling manner, certain nucleophilic reactants, such as the lower aliphatic carboxylic acid nitriles, and alkali metal cyanides or trihaloacetamides, in strong acid medium and aprotic solvent, are not attached to the carbon atom in the 11 position of the $\Delta^{4,9}$-gonadiene-11$\beta$-ol-3-ones, but lead to the obtention of the corresponding 3-oxo-$\Delta^{4,9,11}$-gonatrienes.

The now process, object of the invention, proceeds from this discovery.

In particular, this process offers the advantages of not altering the groups susceptible to attack by strong concentrated acids, due to the mild conditions which it requires (reaction duration relatively short, a weak concentration of the strong acid, aprotic solvent), and it renders the obtention of increased yields possible, which is especially valuable in the case of particularly labile molecules.

This process is characterized in that a $\Delta^{4,9}$-gonadiene-11$\beta$-ol-3-one of the general Formula II

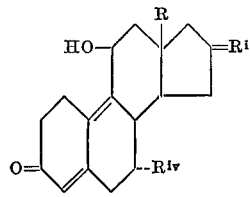

II wherein R, $R^i$ and $R^{iv}$ retain their previous meaning, is subjected to the action of a small amount of a strong acid in the presence of a nucleophilic agent selected from the group consisting of:

(a) A cyanide of the general formula $R^v(CN)_n$ wherein $n$ is selected between 1 and 2, and $R^v$ is selected from the group consisting of an alkyl radical substituted or unsubstituted, comprising from 1 to 6 carbon atoms, and an alkali metal when $n=1$, and (b) A trihaloacetamide, wherein "halo" represents a halogen atom selected from the group consisting of fluorine, chlorine and bromine, conducting the reaction in an aprotic solvent at the ambient temperature, and the desired corresponding $\Delta^{4,9,11}$-gonatriene-3-one is isolated.

The process of the invention is, moreover, characterized by the following points.

(1) The strong acid is chosen from the group consisting of (a) a mineral acid, particularly perchloric acid, sulfuric acid and phosphoric acid, (b) an organic acid, particularly formic acid, acetic acid and p-toluene sulfonic acid and (c) a Lewis acid such as boron trifluoride.

(2) The nucleophilic agent is the nitrile of a lower aliphatic mono- or dicarboxylic acid. Preferably, this nucleophilic agent is a nitrile of a lower alkanoic acid, a dinitrile of a lower alkanedioic acid or a nitrile of a mono-, di- or trihalo lower alkanoic acid, such as acetonitrile, malonic acid dinitrile, dichloroacetonitrile, difluoroacetonitrile, trichloroacetonitrile and trifluoroacetonitrile.

(3) The nucleophilic agent is an alkali metal cyanide such as potassium cyanide and sodium cyanide.

(4) The aprotic solvent is preferably selected from the group consisting of (a) a chlorinated hydrocarbon solvent such as methylene chloride, chloroform and carbon tetrachloride;

(b) an aliphatic or cycloaliphatic hydrocarbon solvent such as alkanes, for example, n-hexane and cycloalkanes, for example, cyclohexane;

(c) an aromatic hydrocarbon solvent such as benzene and toluene; and (d) an ether such as dilower alkyl ethers, cycloalkyl mono- and di-ethers, particularly, ethyl ether, dioxane and tetrahydrofuran.

In the preceding formulas, the radical R is advantageously selected from the following groups: methyl, ethyl, propyl and butyl.

When $R^{ii}$ is an acyl radical of an organic carboxylic acid having from 1 to 18 carbon atoms, this carboxylic acid is advantageously chosen from those acids consisting of aliphatic or cycloaliphatic, saturated or unsaturated organic carboxylic acids, or from those of aromatic or heterocyclic carboxylic acids, or cyclopentyl, cyclohexyl or phenyl-acetic or propionic acids, or phenoxyalkanoic acids, or furan-2-carboxylic acids, or 5-terbutylfuran-2-carboxylic acids or $\beta$-keto-carboxylic acids.

The hydrocarbon radical $R^{iii}$ is advantageously chosen from the group consisting of ethynyl, chloroethynyl, 1-propynyl, vinyl, allyl, methyl and ethyl.

The 3-oxo 11$\beta$-hydroxy $\Delta^{4,9}$-gonadienes of the general Formula II, serving as starting materials in the present process, can be obtained by applying the methods described in the U.S. Patents No. 3,282,785 and No. 3,301,756 and in the U.S. patent application Ser. No. 587,001, filed Oct. 17, 1966.

The following examples are illustrative of the invention. However, it is to be understood that they do not limit the invention in any manner.

EXAMPLE 1

Preparation of 17$\alpha$-ethynyl-$\Delta^{4,9,11}$-estratriene-17$\beta$-ol-3-one

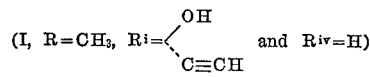

1 gm. of 17-$\alpha$-ethynyl-$\Delta^{4,9}$-estradiene-11$\beta$,17$\beta$-diol-3-one was dissolved in 200 cc. of methylene chloride containing 2 cc. of acetonitrile. Next, 0.8 cc. of an aqueous perchloric acid solution containing 65 gms. of acid per 100 gms. of solution was added thereto. The reaction mixture was agitated for 2 minutes at room temperature and then poured into a water-ice mixture. The organic phase was separated by decanting, washed with water until the wash waters were neutral, and then concentrated to dryness under reduced pressure. The resultant residue was subjected to chromatography through silica gel.

After separation, the product obtained was recrystallized from isopropyl ether, 0.321 gm. of 17$\alpha$-ethynyl-$\Delta^{4,9,11}$-estratriene-17$\beta$-ol-3-one were obtained. The compound had a melting point of 172° C. and a specific rotation $[\alpha]_D^{20} = +63°$ (c.=0.5% in ethanol).

EXAMPLE 2

Preparation of 17$\alpha$-methyl-$\Delta^{4,9,11}$-estratriene-17$\beta$-ol-3-one

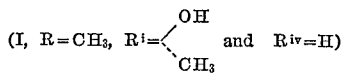

The reaction was carried out according to Example 1 starting with 1 gm. of 17$\alpha$-methyl-$\Delta^{4(5),9(10)}$-estradiene-11$\beta$,17$\beta$-diol-3-one, with a melting point of 192–194° C. 0.426 gm. of the desired 17$\alpha$-methyl-$\Delta^{4,9,11}$-estratriene-17$\beta$-ol-3-one were obtained. The product had a melting point of 170° C. and a specific rotation $[\alpha]_D^{20} = -59°$ (c.=0.5% in ethanol).

EXAMPLE 3

Preparation of 17α-(1′-propynyl)-Δ4,9,11-estratriene-17β-ol-3-one

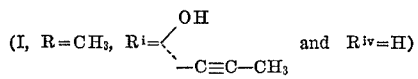

(I, R=CH₃, R^i=OH, —C≡C—CH₃ and R^iv=H)

By working according to Example 1, starting with 1 gm. of 17α-(1′-propynyl)-Δ4,9-estradiene-11β,17β-diol-3-one, the preparation of which is described below, a 0.378 gm. of 17α-(1′-propynyl)-Δ4,9,11-estratriene-17β-ol-3-one was obtained. The product had a melting point of 166° C. and a specific rotation $[\alpha]_D^{20}=+115°$ (c.=0.4% in methanol).

17α-(1′-propynyl)-Δ4,9-estradiene-11β,17β-diol-3-one can be obtained as follows by starting with 3α,3β-dimethoxy-Δ5(10),9(11)-estradiene-17-one.

Step 1: Preparation of 3α,3β-dimethoxy-17α-(1′-propynyl)-Δ5(10),9(11)-estradiene-17β-ol.—500 cc. of a solution containing 13 gm. of propyne gas per hundred grams in tetrahydrofuran were added to 100 cc. of a 3.4 N solution of methyl magnesium bromide in ether, cooled to a temperature between 0 and +5° C. Next, a stream of the propyne gas was allowed to bubble through the solution obtained for 3 hours. Thereafter, 10 gm. of 3α,3β-dimethoxy-Δ5(10),9(11)-estradiene-17-one, dissolved in 100 cc. of benzene, were added. The reaction mixture was held at reflux for 3 hours while continuing to bubble propyne gas therethrough. Thereafter, the mixture was cooled, and a saturated solution of ammonium chloride containing 10% of ammonia was added. After the reaction mixture had been extracted with ether, the ethereal solution was washed with water until the wash waters were neutral, then dried over sodium sulfate and concentrated to dryness under reduced pressure. The residue obtained was purified by chromatography through magnesium silicate. In this manner, 10 gm. of 3α,3β-dimethoxy-17α-(1′-propynyl)-Δ5(10),9(11)-estradiene-17β-ol were obtained.

Ultra-Violet Spectra (in ethanol):

$$\lambda_{max.} \text{ at } 237 \text{ m}\mu \text{ } E^{1\%}_{1 \text{ cm.}} = 546$$

$$\lambda_{max.} \text{ at } 242 \text{ m}\mu \text{ } E^{1\%}_{1 \text{ cm.}} = 565$$

$$\text{Inflection toward } 250 \text{ m}\mu \text{ } E^{1\%}_{1 \text{ cm.}} = 382$$

$$\lambda_{max.} \text{ at } 294 \text{ m}\mu \text{ } E^{1\%}_{1 \text{ cm.}} = 16$$

The N.M.R. spectra (effected in CHCl₃) substantiated the structure of the product obtained; in particular the following value was obtained for the propynyl radical: —C≡C—CH₃: 107 Hz.

Step 2: Preparation of 17α-(1′-propynyl)-Δ5(10),9(11)-estradiene-17β-ol-3-one.—10 gm. of 3α,3β-dimethoxy-17α-(1′-propynyl)-Δ5(10),9(11)-estradiene-17β-ol were introduced into 87 cc. of acetic acid containing 5% of water. The mixture was agitated for 15 minutes at a temperature of 30° C. then 16.5 cc. of water were added, and the reaction mixture was agitated for 1 hour again at a temperature of 30° C., all under an atmosphere of nitrogen. Next, the reaction mixture was cooled, and the precipitate formed was vacuum filtered, washed with water and finally dried. In this manner, 7.9 gm. of 17α-(1′-propynyl)-Δ5(10),9(11)-estradiene-17β-ol-3-one were obtained. The product had a melting point of 140° C.

Ultra-Violet Spectra (in ethanol):

$$\text{Inflection toward } 238 \text{ m}\mu \text{ } E^{1\%}_{1 \text{ cm.}} = 570$$

$$\lambda_{max.} \text{ at } 240-241 \text{ m}\mu \text{ } E^{1\%}_{1 \text{ cm.}} = 581$$

$$\text{Inflection toward } 250 \text{ m}\mu \text{ } E^{1\%}_{1 \text{ cm.}} = 386$$

$$\lambda_{max.} \text{ at } 299 \text{ m}\mu \text{ } E^{1\%}_{1 \text{ cm.}} = 8.4$$

The product obtained was solvated with acetic acid and, under vacuum at a temperature of 120° C., lost 11% of its weight. The coefficient of molecular extinction at 240–241 mμ, corrected to take into account this solvation, was equal to 20,000.

Step 3: Preparation of 11β-hydroperoxy-17α-(1′-propynyl)-Δ4,9-estradiene-17β-ol-3-one.—First, 0.660 gm. of azo-bis-isobutyronitrile, then 6.6 gm. of 17α-(1′-propynyl)-Δ5(10),9(11)-estradiene-17β-ol-3-one (11% solvated) were introduced into 660 cc. of ethanol containing 1% of triethylamine. A stream of oxygen was allowed to bubble through the solution obtained over a period of 20 hours at a temperature of +30° C. Thereafter, the solution was concentrated to a small volume under reduced pressure. The concentrate was poured into 600 cc. of a salt water-ice mixture. The precipitate thus formed was vacuum filtered, washed with water and dried. In this manner, 4.8 gm. of 11β-hydroperoxy-17α-(1′-propynyl)-Δ4,9-estradiene-17β-ol-3-one were obtained. The product had a melting point of 120–140° C., not distinct, and was utilized directly for the next step.

This compound is not described in the literature.

Step 4: Preparation of 17α-(1′-propynyl)-Δ4,9-estradiene-11β,17β-diol-3-one.—4.8 gm. of 11β-hydroperoxy-17α-(1′-propynyl)-Δ4,9-estradiene-17β-ol-3-one were introduced into 40 cc. of methanol, and a slight amount of insolubles were eliminated by filtration. Under an atmosphere of nitrogen and at a temperature of 30° C., 5 cc. of trimethylphosphite were added to the filtrate obtained. The mixture was then agitated for 30 minutes at a temperature of 30° C., 50 gm. of water-ice mixture and 5 cc. of 30% hydrogen peroxide solution were added. Next, the reaction mixture was allowed to stand for 15 minutes, then a precipitation was started by an addition of a salt water-ice mixture. The precipitate formed was vacuum filtered and dried. 3.1 gm. of raw 17α-(1′-propynyl)-Δ4,9-estradiene-11β,17β-diol-3-one were obtained. By extraction of the mother liquors with ether, a second yield of 1.4 gm. of the same compound was obtained. The mixture of the two products previously obtained was subjected to chromatography through silica gel. After separation, the product was recrystallized from isopropyl ether. 1.89 gm. of 17a-(1′-propynyl)-Δ4,9-estradiene-11β,17β-diol-3-one were recovered. The product had a melting point of 168° C. and a specific rotation $[\alpha]_D^{20}$ (corrected)=—35° (c.=0.5% in ethanol).

This product possessed a solvation of 4.1 gm. per hundred (loss of weight at 135° C. under vacuum).

Analysis: C₁₂H₂₆O₃; molecular weight=326.42. Calculated: C, 77.27%; H, 8.02%. Found: C, 77.5%; H, 8.2%.

Utra-Violet Spectra (in ethanol):

$$\lambda_{max.} \text{ at } 230 \text{ m}\mu \text{ } E^{1\%}_{1 \text{ cm.}} = 146$$

$$\lambda_{max.} \text{ at } 297 \text{ m}\mu \text{ } E^{1\%}_{1 \text{ cm.}} = 599$$

in control values.

This compound is not described in the literature.

EXAMPLE 4

Preparation of 17α-chloroethynyl-Δ$^{4,9,11}$-estratriene-17β-ol-3-one

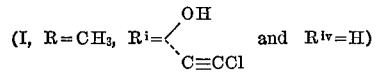
(I, R=CH₃, R$^i$=⟨OH, C≡CCl⟩ and R$^{iv}$=H)

By working as described in Example 1, starting with 1 gm. of 17α-chloroethynyl-Δ$^{4,9}$-estradiene-11β,17β-diol-3-one, having a melting point of 210° C. and a specific rotation [α]$_D^{20}$=—42° (c.=0.5% in ethanol), 0.285 gm. of 17α-chloroethynyl-Δ$^{4,9,11}$-estratriene-17β-ol-3-one were obtained. This product had a melting point of 194° C.

EXAMPLE 5

Preparation of 17α-allyl-Δ$^{4,9,11}$-estratriene - 17β-ol-3-one

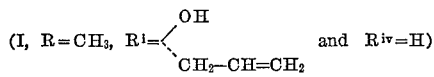
(I, R=CH₃, R$^i$=⟨OH, CH₂—CH=CH₂⟩ and R$^{iv}$=H)

The reaction was carried out in the same manner as described in Example 1 by starting with 17α-allyl-Δ$^{4,9}$-estradiene-11β,17β-diol-3-one, thus obtaining 17α-allyl-Δ$^{4,9,11}$-estratriene-17β-ol-3-one. The product had a melting point of 120° C. and a specific rotation [α]$_D^{20}$=—72° (c.=0.5% in ethanol).

The starting product, namely, 17α-allyl-Δ$^{4,9'}$-estradiene-11β,17β-diol-3-one, can be prepared in accordance with the process described in U.S. Patent No. 3,282,785, as follows:

Step A: 3.48 gm. of 17α-allyl-Δ$^{5(10),9(11)}$-estradiene-17β-ol-3-one were dissolved in 40 cc. of ethanol containing 1% of triethylamine, then a stream of oxygen was allowed to pass through the solution for a period of 4 hours. In this manner, after evaporation under vacuum, 4 gm. of raw 11β-hydroperoxy-17α-allyl-Δ$^{4,9}$-estradiene-17β-ol-3-one were obtained. This product was utilized as such in the next step.

This product is not described in the literature.

Step B: The raw product obtained in Step A was dissolved in 20 cc. of methanol, then 2 cc. of trimethylphosphite were added under agitation and under an atmosphere of nitrogen. The reaction mixture was kept for 30 minutes at a temperature of 50° C., then it was cooled to 20° C. Next, 10 cc. of 30% hydrogen peroxide solution with 200 cc. of water were added, and the reaction mixture was agitated for 15 minutes. Thereafter, the reaction mixture was extracted with methylene chloride. The extracts were washed with salt water, then dried and finally the organic solvent was evaporated. The residue was dissolved in benzene containing 10% of ethanol and subjected to chromatography through silica gel. After elution with the same solvent and recrystallization from isopropyl ether, 2.75 gm. of 17α-allyl-Δ$^{4,9}$-estradiene-11β,17β-diol-3-one were recovered. The produce had a melting point of 176° C.

This product is not described in the literature.

EXAMPLE 6

Preparation of 13β-ethyl-17α-ethynyl-Δ$^{4,9,11}$-gonatriene-17β-ol-3-one

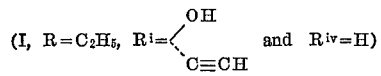
(I, R=C₂H₅, R$^i$=⟨OH, C≡CH⟩ and R$^{iv}$=H)

By working according to the method described in Example 1, and by starting with 13β - ethyl-17α - ethynyl-Δ$^{4,9}$-gonadiene-11β,17β-diol-3-one, having a melting point of 200° C. (described in the copending, commonly-assigned U.S. patent application Ser. No. 587,001, filed Oct. 17, 1966), 13β-ethyl-17α-ethynyl-Δ$^{4,9,11}$-gonatriene-17β-ol-3-one was obtained. The compound had a melting point of 154° C., with a specific rotation

[α]$_D^{20}$=+84.5°

(in ethanol).

EXAMPLE 7

Preparation of 7α-methyl-17α-ethynyl-Δ$^{4,9,11}$-estratriene-17β-ol-3-one

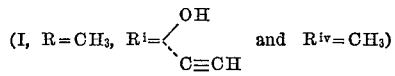
(I, R=CH₃, R$^i$=⟨OH, C≡CH⟩ and R$^{iv}$=CH₃)

By working in conformance with the method described in Example 1, starting with 7α - methyl - 17α-ethynyl-Δ$^{4,9}$-estradiene-11β,17β-diol-3-one, having a melting point of 195° C. (described in the copending, commonly-assigned U.S. patent application Ser. No. 587,001, filed Oct. 17, 1966), 7α-methyl-17α-ethynyl-Δ$^{4,9,11}$-estratriene-17β-ol-3-one was obtained, having a melting point of 215° C. and a specific rotation [α]$_D^{20}$=—38° (c.=0.5% in methanol).

EXAMPLE 8

Preparation of 7α,17α-dimethyl-Δ$^{4,9,11}$-estratriene-17β-ol-3-one

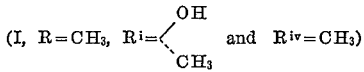
(I, R=CH₃, R$^i$=⟨OH, CH₃⟩ and R$^{iv}$=CH₃)

By working according to the method described in Example 1, starting with 7α-17α-dimethyl-Δ$^{4,9}$-estradiene-11β,17β-diol-3-one (described in our copending U.S. patent application Ser. No. 615,088, filed Feb. 10, 1967, entitled "Preparation of Unsaturated 19-Nor Steroids"), 7α,17α-dimethyl - Δ$^{4,9,11}$-estratriene-17β-ol-3-one was obtained, having a melting point of 173° C. and a specific rotation [α]$_D^{20}$=—125° (c.=0.57% in methanol).

Step A: Preparation of 7α,17α-dimethyl-11β-hydroperoxy - Δ$^{4,9}$-estradiene-17β-ol-3-one.—1 gm. of 7α,17α-dimethyl-Δ$^{5(10),9(11)}$-estradiene - 17β - ol-3-one (described in U.S. patent application Ser. No. 576,240, filed Aug. 31, 1966), was introduced into 28 cc. of ethanol containing 1% of triethylamine. A stream of oxygen was bubbled through this mixture for 24 hours at room temperature and thereafter, the reaction mixture was evaporated to dryness to obtain 1.4 gm. of 7α,17α-dimethyl-11β-hydroperoxy-Δ$^{4,9}$-estradiene - 17β - ol-3-one, which was utilized as such for the next step.

This product is not described in the literature.

Step B: Preparation of 7α,17α-dimethyl-Δ$^{4,9}$-estradiene-11β,17β-diol-3-one.—1.4 gm. of 7α,17α-dimethyl - 11β-hydroperoxy-Δ$^{4,9}$-estradiene - 17β - ol-3-one, obtained in Step A, were introduced into 5 cc. of ethanol and after 0.5 cc. of triethyl phosphite were added thereto, the mixture was agitated for 1 hour at reflux. Then, the reaction mixture was cooled to room temperature, 1.1 cc. of 30% hydrogen peroxide and 1.1 cc. of water were added thereto and the mixture was agitated for 1 hour after which 35 cc. of water were added. The reaction mixture was extracted with methylene chloride and the organic phase was washed with water, dried over sodium sulfate and evaporated to dryness. The residue was triturated in hot isopropyl ether, then iced and filtered. The precipitate was vacuum filtered, washed with water and dried to obtain 0.59 gm. of 7α-17α-dimethyl-Δ$^{4,9}$-estradiene-11β,-17β-diol-3-one.

This product is not described in the literature.

Working in analogous fashion by starting with 17α-ethyl - Δ$^{4,9}$ - estradiene - 11β,17β - diol - 3 - one, 17α-ethyl Δ$^{4,9,11}$-estratriene-17β-ol-3-one

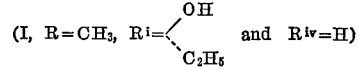
(I, R=CH₃, R$^i$=⟨OH, C₂H₅⟩ and R$^{iv}$=H)

was obtained. The product had a melting point of 135° C. and a specific rotation [α]$_D^{20}$=—87.5° (c.=0.5% in methanol).

EXAMPLE 9

Preparation of 17α-ethynyl-Δ$^{4,9,11}$-estratriene-17β-ol-3-one (I, R=CH$_3$, R$^i$=⟨OH / C≡CH  and R$^{iv}$=H)

500 mg. of 17α-ethynyl-Δ$^{4,9}$-estradiene-11β,17β-diol-3-one were dissolved in 25 cc. of methylene chloride. Next, 500 mg. of potassium cyanide, then 0.5 cc. of an aqueous perchloric acid solution containing 65 gm. of acid per 100 gm. of solution, were added thereto. The mixture was agitated for 3 minutes, then poured into a water-ice mixture. The organic phase was separated by decanting, washed with water until the wash waters were neutral and then concentrated to dryness under reduced pressure. The residue was subjected to chromatography through silica gel. 235 mg. of 17α-ethynyl-Δ$^{4,9,11}$-estratriene-17β-ol-3-one were obtained. The product was recrystallized from isopropyl ether to give a product having a melting point of 172° C. with a specific rotation of $[α]_D^{20}$=+63° (c.=0.5% in ethanol).

EXAMPLE 10

Preparation of 17α-ethynyl-Δ$^{4,9,11}$-estratriene-17β-ol-3-one (I, R=CH$_3$, R$^i$=⟨OH / C≡CH  and R$^{iv}$=H)

0.2 gm. of 17α-ethynyl-Δ$^{4,9}$-estradiene-11β,17β-diol-3-one were dissolved in 10 cc. of methylene chloride containing 0.1 gm. of trifluoroacetamide, then 0.2 cc. of an aqueous 65% perchloric acid solution were added. The mixture was agitated for 2 minutes at room temperature. The mixture was then poured into water. The organic phase was separated and washed with water until the wash waters were neutral and distilled to dryness. The residue was subjected to chromatography through silica gel with elution with a benzene-ethyl acetate mixture (7:3). The product obtained was purified by recrystallization from isopropyl ether, and 0.07 gm. of 17α-ethynyl-Δ$^{4,9,11}$-estratriene-17β-ol - 3 - one was recovered, which product was identical to that obtained in Example 1.

The preceding examples are illustrative of the process of the invention. It is to be understood, however, that other expedients known to those skilled in the art may be employed without departing from the spirit of the invention.

We claim:

1. A process for the production of Δ$^{4,9,11}$-gonatriene-3-ones of the formula wherein R is lower alkyl; R$^1$ is selected from the group consisting of oxygen and ⟨OR$^{ii}$ / R$^{iii}$ R$^{ii}$ is selected from the group consisting of hydrogen and an acyl radical of an organic carboxylic acid having from 1 to 18 carbon atoms; R$^{iii}$ is selected from the group consisting of hydrogen, lower alkyl, lower alkenyl, lower alkynyl, substituted lower alkyl, substituted lower alkenyl and substituted lower alkynyl; and R$^{iv}$ is selected from the group consisting of hydrogen and methyl; which comprises subjecting the corresponding Δ$^{4,9}$-gonadiene-11β-ol-3-one of the formula wherein R, R$^i$ and R$^{iv}$ have the above assigned values, to the action of a nucleophilic agent selected from the group consisting of alkali metal cyanides, lower aliphatic carboxylic acid nitriles and trihaloacetamides in the presence of a strong Lewis-type acid and an aprotic solvent and recovering said Δ$^{4,9,11}$-gonatriene-3-ones.

2. The process of claim 1 wherein said strong Lewis-type acid is selected from the group consisting of perchloric acid, sulfuric acid, phosphoric acid, formic acid, acetic acid, p-toluene sulfonic acid and boron trifluoride.

3. The process of claim 1 wherein said nucleophilic agent is a nitrile selected from the group consisting of acetonitrile, malonic dinitrile, dichloroacetonitrile, difluoroacetonitrile, trichloroacetonitrile and trifluoroacetonitrile.

4. The process of claim 1 wherein said nucleophilic agent is a cyanide selected from the group consisting of sodium cyanide and potassium cyanide.

5. The process of claim 1 wherein said aprotic solvent is selected from the group consisting of chlorinated hydrocarbon solvents, aliphatic hydrocarbon solvents, cycloaliphatic hydrocarbon solvents, aromatic hydrocarbon solvents and ethers.

6. The process of claim 1 wherein said aprotic solvent is selected from the group consisting of methylene chloride, chloroform, carbon tetrachloride, n-hexane, cyclohexane, benzene, toluene, ethyl ether, dioxane and tetrahydrofuran.

7. 11β - hydroperoxy - 17α-(1'-propynyl)-Δ$^{4,9}$-estradiene-17β-ol-3-one.

8. 17α - (1' - propynyl)-Δ$^{4,9}$-estradiene - 11β,17β-diol-3-one.

9. 17α-allyl-Δ$^{4,9}$-esteradiene - 11β,17β - diol - 3 - one.

References Cited

UNITED STATES PATENTS 3,282,785  11/1966  Joly et al. _____ 167—65

FOREIGN PATENTS 1,413,895  9/1965  France.

ELBERT L. ROBERTS, Primary Examiner

U.S. Cl. X.R.

260—397.45